United States Patent Office.

MORITZ ULRICH, OF ELBERFELD, GERMANY, ASSIGNOR TO THE FARBENFABRIKEN, VORMALS FR. BAYER & CO., OF SAME PLACE.

RED AZO DYE.

SPECIFICATION forming part of Letters Patent No. 466,841, dated January 12, 1892.

Application filed July 11, 1891. Serial No. 399,241. (Specimens.) Patented in England November 19, 1889, No. 18,517; in France February 12, 1890, No. 203,744, and in Germany October 20, 1890, No. 54,116.

*To all whom it may concern:*

Be it known that I, MORITZ ULRICH, doctor of philosophy, residing at Elberfeld, in the Empire of Germany, (assignor to the FARBENFABRIKEN, VORMALS FR. BAYER & CO., at Elberfeld,) have invented a new and useful Improvement in the Manufacture of Dye-Stuffs, (for which the above-mentioned FARBENFABRIKEN have already obtained Letters Patent in Germany, No. 54,116, dated October 20, 1890; in France, No. 203,744, dated February 12, 1890, and in England, No. 18,517, dated November 19, 1889,) of which the following is a specification.

My invention relates to the production of a new red azo color of the formula:

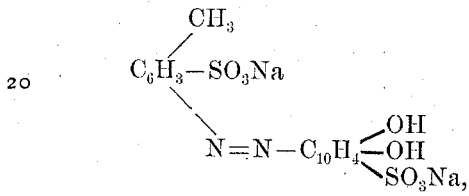

obtained by combining one molecular proportion of the diazo compound of toluidine sulpho-acid with one molecular proportion of the dihydroxynaphthaline monosulpho-acid described in my Letters Patent No. 444,679, dated January 13, 1891.

In carrying out my process practically I proceed as follows: Nineteen kilos of toluidine monosulpho-acid are suspended in hydrochloric acid and diazotized by a watery solution containing seven kilos of sodium nitrite, whereupon the diazo solution is allowed to flow slowly into a solution of 26.2 kilos of the sodium salt of dihydroxynaphthaline monosulpho-acid and of acetate of soda in excess. With the aid of common salt the now almost instantly formed azo coloring-matter is to be precipitated in the known manner. After some time the precipitate is filtered off and dried. It forms in dry state a gray-violet amorphous powder, which very easily dissolves in water, giving a bluish-red exceedingly clear color, likewise readily in soda-lye and ammonia with a very clear and pure red color. In concentrated sulphuric acid it is soluble with deep blue violet color.

The new coloring-matter dyes wool in acid baths in bluish-red shades excellent for their purity.

Having thus described my invention and in what manner it is to be performed, that which I claim as new, and desire to secure by Letters Patent, is—

1. The process of producing the new coloring-matter, which consists in combining molecular proportions of toluidine sulpho-acid after diazotation and of the dihydroxynaphthaline monosulphonic-acid described in my Letters Patent No. 444,679, dated January 13, 1891.

2. As a new product, that azo dye-stuff which results from the combination of the toluidine sulpho-acid with the dihydroxynaphthaline monosulpho-acid described in my Letters Patent No. 444,679, dated January 13, 1891, and which exists in dry state as a gray-violet amorphous powder, is very easily soluble in water with bluish-red exquisitely clear and pure color, in soda-lye and ammonia it dissolves likewise readily and with red color of great purity, while it is dissolved by concentrated sulphuric acid with deep bluish-violet color.

In testimony whereof I have signed my name in presence of two subscribing witnesses.

MORITZ ULRICH.

Witnesses:
 WM. ESSERWEIN,
 RUDOLPH FRICKE.